United States Patent [19]
Loeffler et al.

[11] 4,314,864
[45] Feb. 9, 1982

[54] METHOD AND APPARATUS FOR BUILDING A TIRE

[75] Inventors: Earl F. Loeffler, Uniontown; Harley P. Weyand, Jr., Doylestown, both of Ohio

[73] Assignee: The Firestone Tire & Rubber Company, Akron, Ohio

[21] Appl. No.: 147,668

[22] Filed: May 7, 1980

[51] Int. Cl.³ .......................................... B29H 17/16
[52] U.S. Cl. .................................. 156/111; 156/126; 156/132; 156/396; 156/405 R
[58] Field of Search .................. 156/111, 126, 128 R, 156/131–133, 396, 403, 405 R, 406

[56] References Cited
U.S. PATENT DOCUMENTS

| | | | |
|---|---|---|---|
| 3,038,526 | 6/1962 | Brey | 156/420 |
| 3,077,918 | 2/1963 | Noall | 156/420 |
| 3,257,255 | 6/1966 | Batter | 156/403 |
| 3,676,260 | 7/1972 | Appleby et al. | 156/396 |
| 3,740,293 | 6/1973 | Jones et al. | 156/132 |
| 3,944,456 | 3/1976 | Cantarutti | 156/398 |
| 4,048,002 | 9/1977 | Mallory | 156/403 |
| 4,053,342 | 10/1977 | Appleby et al. | 156/123 R |
| 4,230,517 | 10/1980 | Enders | 156/126 |

Primary Examiner—Kittle John E.

[57] ABSTRACT

The present invention discloses a tire building apparatus (10) and preferred method for building a tire. The apparatus includes a longitudinally movable carriage (12), a guideway (20) for the longitudinal movement of the carriage, a headstock (14) mounted on the carriage, a tire assembly drum (11) having an inboard end (29) and an outboard end (28), and a drum support (15) mounted on the carriage. A plurality of operation stations (A–G) are spaced longitudinally along the guideway, and mechanical datum (30), fixedly located at each operation station, are provided to engage mechanical locators (31) secured to the carriage. A bladder (42) is provided selectively to cause engagement of the locators with the mechanical datum at each successive station to locate the tire assembly drum precisely with respect to the operation station. The apparatus further includes means (133) to swing the drum support pivotally between an active and passive position, respectively, to engage and disengage a bearing assembly (130) with the hub of the drum, a tailstock (142) movable along a guideway (145) and onto the longitudinally movable carriage, grab segments (186) mounted on the tailstock selectively to deposit and remove annular assemblies (183,188) from the drum, and a stitcher (70) mounted on the carriage.

17 Claims, 19 Drawing Figures

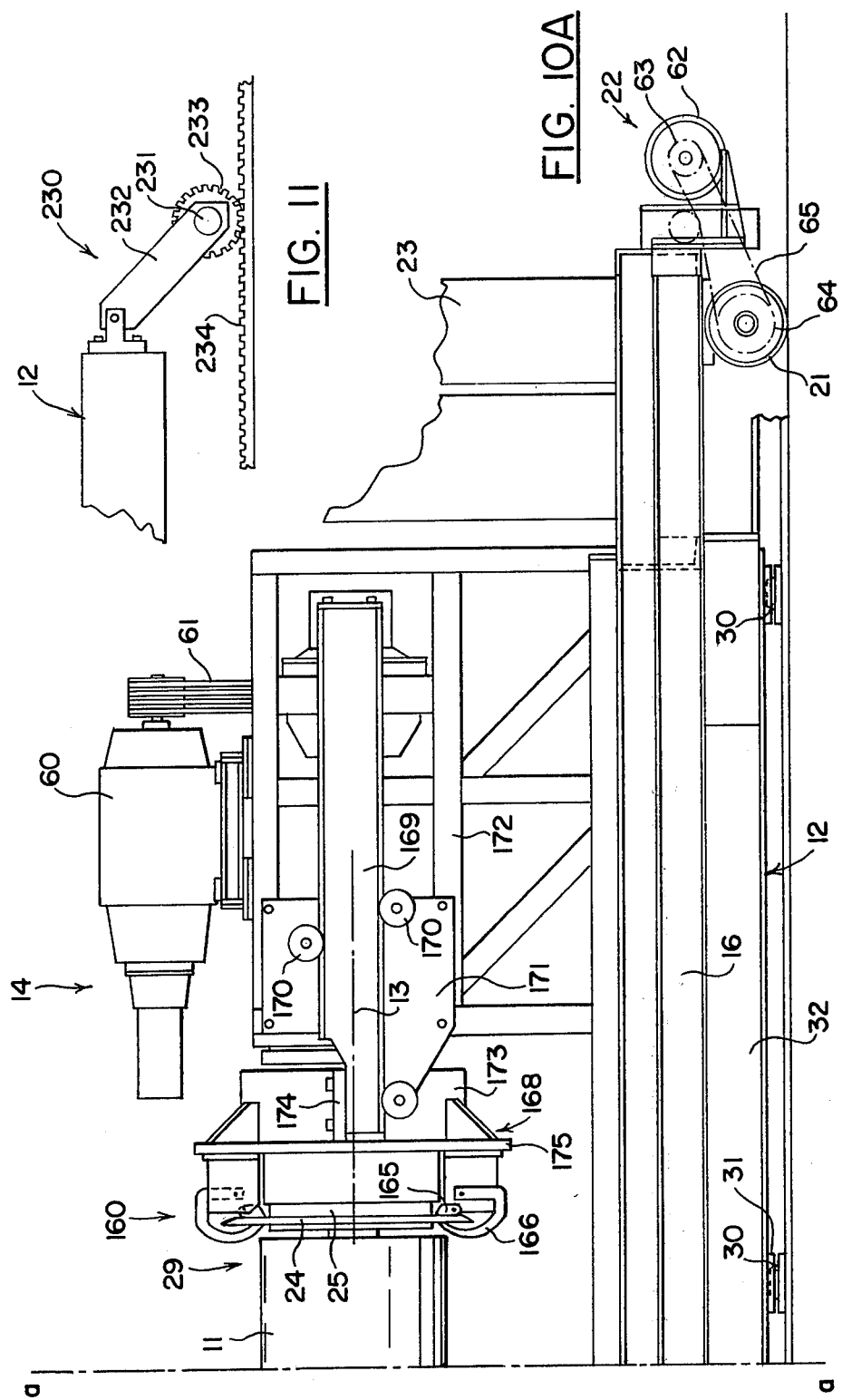

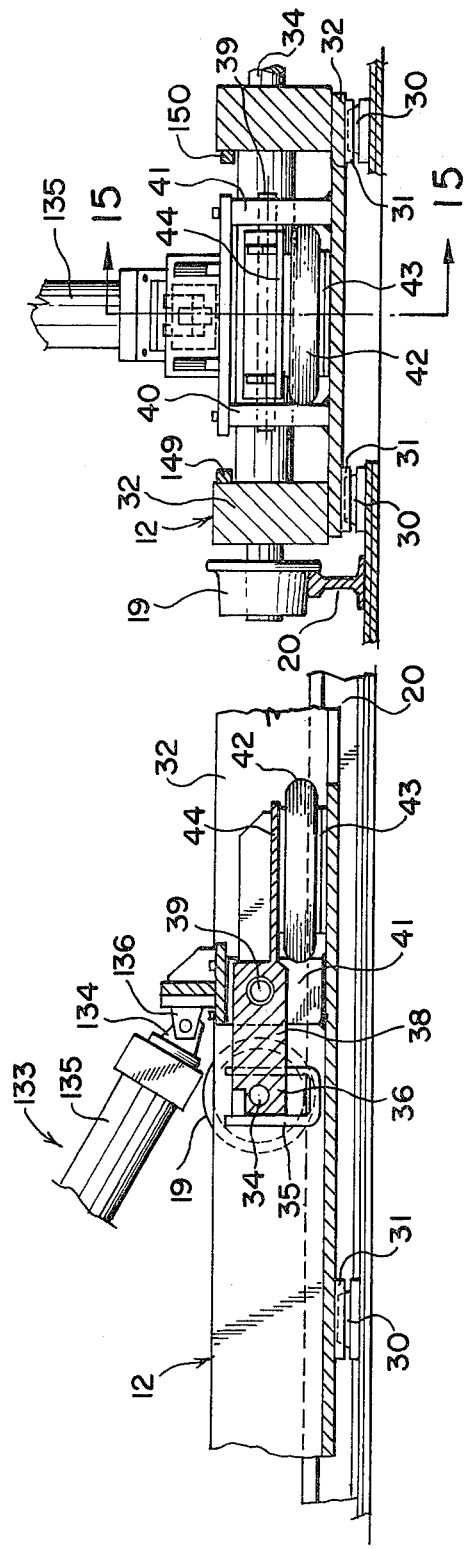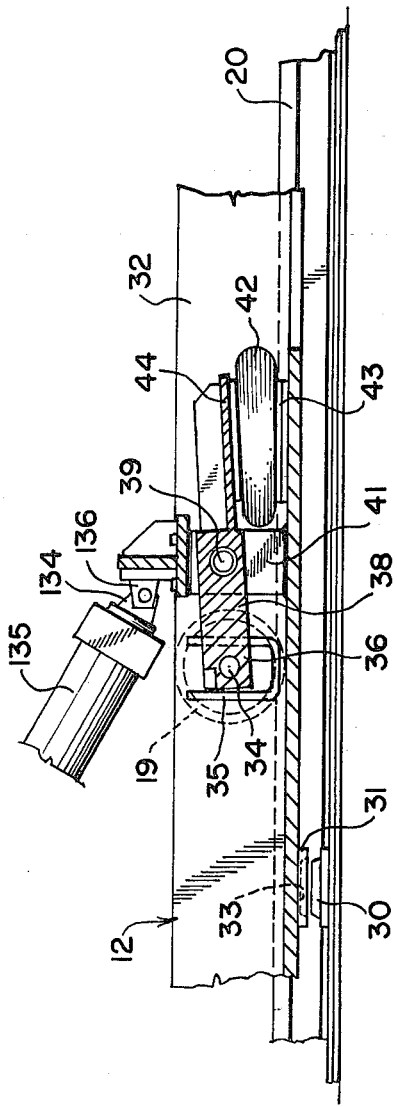
FIG. 14
FIG. 15
FIG. 16

METHOD AND APPARATUS FOR BUILDING A TIRE

TECHNICAL FIELD

The present invention relates to a method and apparatus for making pneumatic tires.

More particularly, the present invention relates to an apparatus and method by which a tire building drum is mounted on a movable carriage, and the carriage is moved to, and past, a successive series of servers, each of which presents one or more components that are wound onto the tire assembly drum.

Specifically, the present invention relates to a tire building apparatus wherein a carriage on which the tire assembly drum is mounted is precisely located at a sequential series of operation stations to receive the components for a tire casing. The tire assembly drum cooperates with a drum support mounted on the carriage, and, selectively, with an independently mounted tailstock adapted to position at least one bead bundle, the belts and treadstock with respect to the drum. As the drum then expands from its cylindrical to its toroidal configuration, the components carried on the tailstock are precisely and firmly engaged by those on the assembly drum such that support of the components presented by the tailstock is effectively transferred to the drum, while maintaining the accuracy of their relative disposition.

BACKGROUND ART

Traditionally, the multiple components required to build a pneumatic tire are assembled on a tire building drum rotatably mounted in front of the operator. The components are presented from individual servers or component racks located on the side of the assembly drum opposite the operator or adjacent to him. The operator then rotates the drum and by the use of mechanical aids guides the successive components into their proper position on the assembly drum.

This has been the traditional method and apparatus for making bias ply tires. However, radial tires require very precise placement of the various components and, for production runs, the ability to repeat accurately the placement of components.

It should be appreciated that whereas bias ply tires can be assembled in their entirety as a cylindrical band and then shaped and cured in a mold, the casing for a radial tire must generally be shaped to its toroidal configuration prior to placement of the inextensible bands that underlie the treadstock. Hence, radial tires are often built by a two-stage process. That is, the components, except for the belts and treadstock, are assembled on a first drum, the beads are set in place and the resulting cylindrical band removed and mounted on a second drum which expands the band into a toroidal casing, whereupon the belts and treadstock are applied. This much handling can be deleterious unless extreme caution is exercised.

It is, therefore, desirable to build the entire tire on a single-stage drum so that the green tire is completed before removal. It has, however, heretofore been difficult to achieve accurate bead placement and accurate belt placement on the same drum, largely because of the multiplicity of servers required at a single location and the multiple guides required to place components on a cylindrical surface and later components on a toroidal surface at the same location, while relating placement of all components to a single reference plane transversely of the rotational axis of the finished product.

DISCLOSURE OF THE INVENTION

It is, therefore, a primary object of the present invention to provide a tire building apparatus wherein a tire assembly drum is accurately aligned with the server from which the components emanate in order to minimize handling of the components while accurately presenting the components to the tire assembly drum.

It is another object of the present invention to provide a tire building apparatus employing a tire assembly drum, as above, wherein the servers are located at individual operation stations, and the tire assembly drum is moved successively to these stations.

It is a further object of the present invention to provide a tire building apparatus, as above, wherein the tire assembly drum is mounted on a carriage movable along a guideway to successive operation stations; at each station mechanical locators on the carriage interact with a mechanical datum at the station to assure precise alignment of the tire building drum on the carriage with the server at that station.

It is a still further object of the present invention to provide a tire building apparatus, as above, wherein an automatic stitcher is mounted on the carriage to effect stitching of the sequentially applied components deposited on the flat drum.

It is a further object of the present invention to provide unique grab assemblies, mounted on a tailstock operatively engaging the tire assembly drum, which place a treadstock and belt preassembly accurately over the drum so that, as the drum expands to form the toroidal tire casing from the cylindrical band, the components carried on the drum will precisely interrelate with those presented by the grab assemblies.

It is yet another object of the present invention to provide a tire building apparatus, as above, which employs the facile and accurate use of a single-stage tire assembly drum.

These and other objects, together with the advantages thereof over existing and prior art forms which will become apparent from the following specification, are accomplished by means hereinafter described and claimed.

In general, a tire building apparatus embodying the concept of the present invention employs a carriage that is movable along a track, or guideway. A headstock is mounted on the carriage, and supports the inboard end of a tire assembly drum. A drum support is also mounted on the carriage and rotatably supports the outboard end of the tire assembly drum.

A plurality of servers are spaced longitudinally at different operation stations along the guideway so that as the carriage moves therealong, the tire assembly drum may be positioned at successive stations. Each station has a mechanical datum associated therewith, and mechanical locators secured to the carriage selectively interact with the datum at each station to locate the tire assembly drum precisely with respect to the server at that station.

The drum support is pivotally mounted on the carriage to swing between an active position—in which it supports the tire assembly drum—and a passive position—in which it is disengaged from the building drum and lies substantially parallel to the carriage. When the drum support is in the passive position, a tailstock is movable onto the carriage to rotatably support the outboard end of the drum. Grab paddles are mounted on the tailstock selectively to deposit certain annular assemblies on the drum and remove others therefrom.

A method for making tires which is particularly suited for the foregoing apparatus involves the steps of providing a movable carriage carrying a tire assembly drum, supporting the outboard end of the rotatable tire assembly drum by a drum support; providing a tailstock on a second movable carriage, moving the carriage successively to a plurality of operation stations, precisely orienting the carriage at each station, and sequentially applying tire components to the tire assembly drum at successive operation stations.

After a number of the tire components have been applied to the assembly drum, the method continues with the steps of moving the drum support to a passive position; moving the tailstock onto the first carriage and rotatably engaging the outboard end of the tire assembly drum with the tailstock, toroidally shaping the components on the tire assembly drum against a tread assembly held by the tailstock, stitching the tire components on the tire assembly drum and removing the completed green tire.

One preferred embodiment of the subject tire building apparatus is shown by way of example in the accompanying drawings and described in detail, including a description of one suitable method for using such apparatus, without attempting to show all of the various forms and modifications in which the invention might be embodied; the invention being measured by the appended claims and not the details of the specification.

BRIEF DESCRIPTION OF THE DRAWINGS

FIGS. 10A and 10B are contained on two sheets and depict a side elevation of the carriage, and associated components, employed in the subject tire building apparatus, said drawing having been separated along line a—a with FIG. 10A appearing on sheet 6 and FIG. 10B appearing on sheet 7;

FIG. 11 is an enlarged view of an indexing mechanism provided at the rear base of the carriage for positioning the carriage and platform at various stations;

FIG. 14 is a longitudinal cross section taken substantially along line 14—14 of FIG. 10B;

FIG. 15 is a transverse cross section taken substantially along line 15—15 of FIG. 14 depicting the mechanism by which the carriage is selectively raised and lowered and depicting the carriage lowered to engage the locator plates thereon with the mechanical datum at one of the operation stations;

FIG. 16 is a view similar to FIG. 15 but depicting the carriage in raised condition;

PREFERRED MODE FOR CARRYING OUT THE INVENTION

Figure 1:
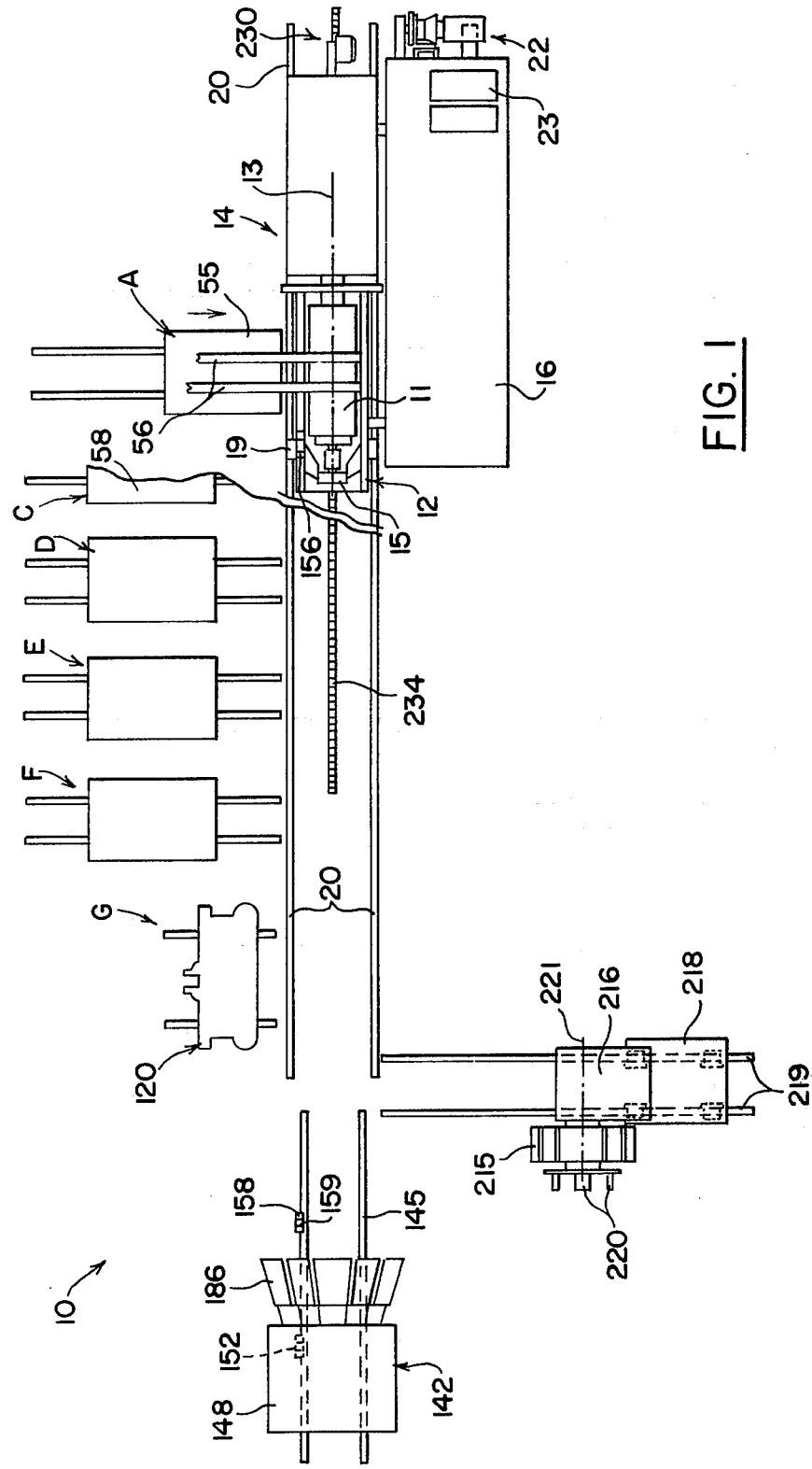
FIG. 1 is a schematic plan view of a tire building apparatus embodying the concept of the present invention and depicting the tire assembly drum at operation station A.
Figure 10B:
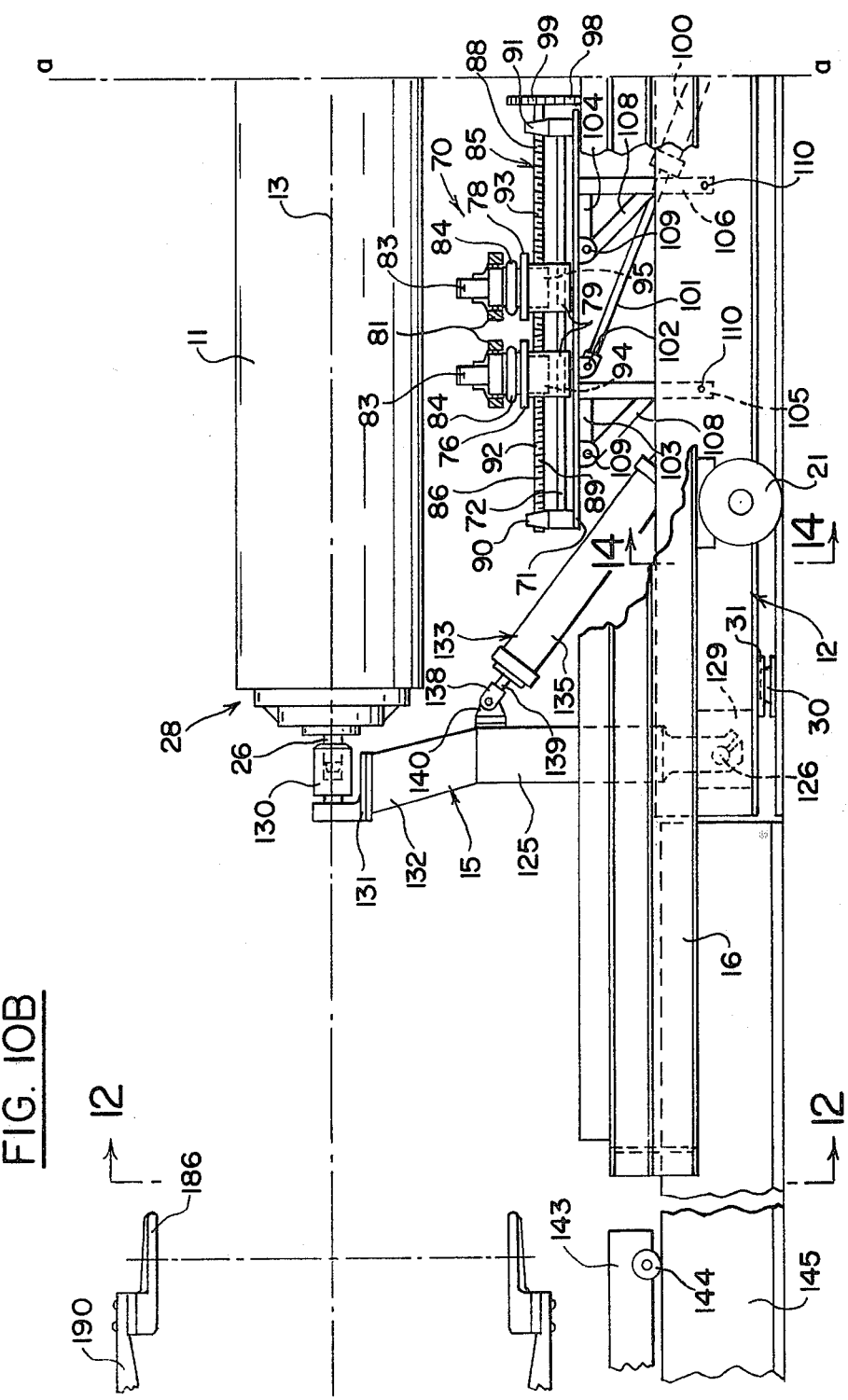

With more particular reference to FIGS. 1, 10A and 10B of the drawings, a tire building machine embodying the concepts of the present invention is designated generally by the numeral 10, it will be seen that a tire assembly drum 11 is mounted on a carriage 12 movable longitudinally parallel to the axis 13 of the assembly drum 11. Specifically, the drum 11 is supported between a headstock 14 and a retractable drum support 15 both secured to, and, when engaging the drum 11, extending upwardly from, the carriage 12. As is best seen in FIG. 10A, the headstock 14 supports an electric motor 60 which drives, as by belts 61, a spindle secured to the shaft (not shown) which rotates the tire assembly drum 11.

Figure 12:
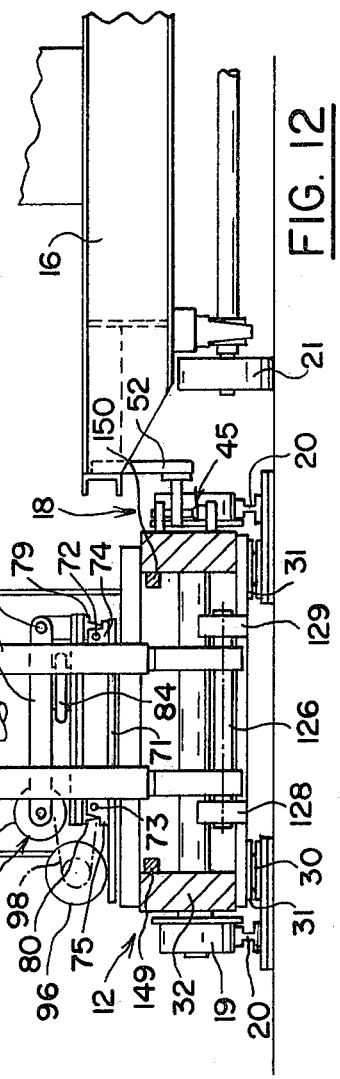
FIG. 12 is an end elevation of the carriage, platform and tire assembly drum taken substantially along line 12—12 of FIG. 10B.

The carriage 12 is attached to an operator's platform 16 as at 18 in FIG. 12, and is movable longitudinally therewith. The carriage is individually supported on wheels 19 that ride along individual tracks, or rails 20, that form a guideway. Similarly, wheels 21 are provided under the platform 16 which roll along the ground powered by a drive system referred to generally by the numeral 22, which includes a selectively operable drive motor 62, sprockets 63, 64 and chain 65 (FIG. 10A).

Due to the complexity of the subject tire building apparatus 10, an understanding of its construction and operation will be greatly facilitated by discussing its general mode of operation concurrently with the description of the major components and thereafter focusing on constructional details of the various components that may not be readily apparent from the operational overview.

To that end, an operator will normally be positioned on platform 16 with ready access to the power and sequencing panels 23 as well as suitable foot controls (not shown) all of which are, for convenience, mounted on platform 16.

Figure 17:
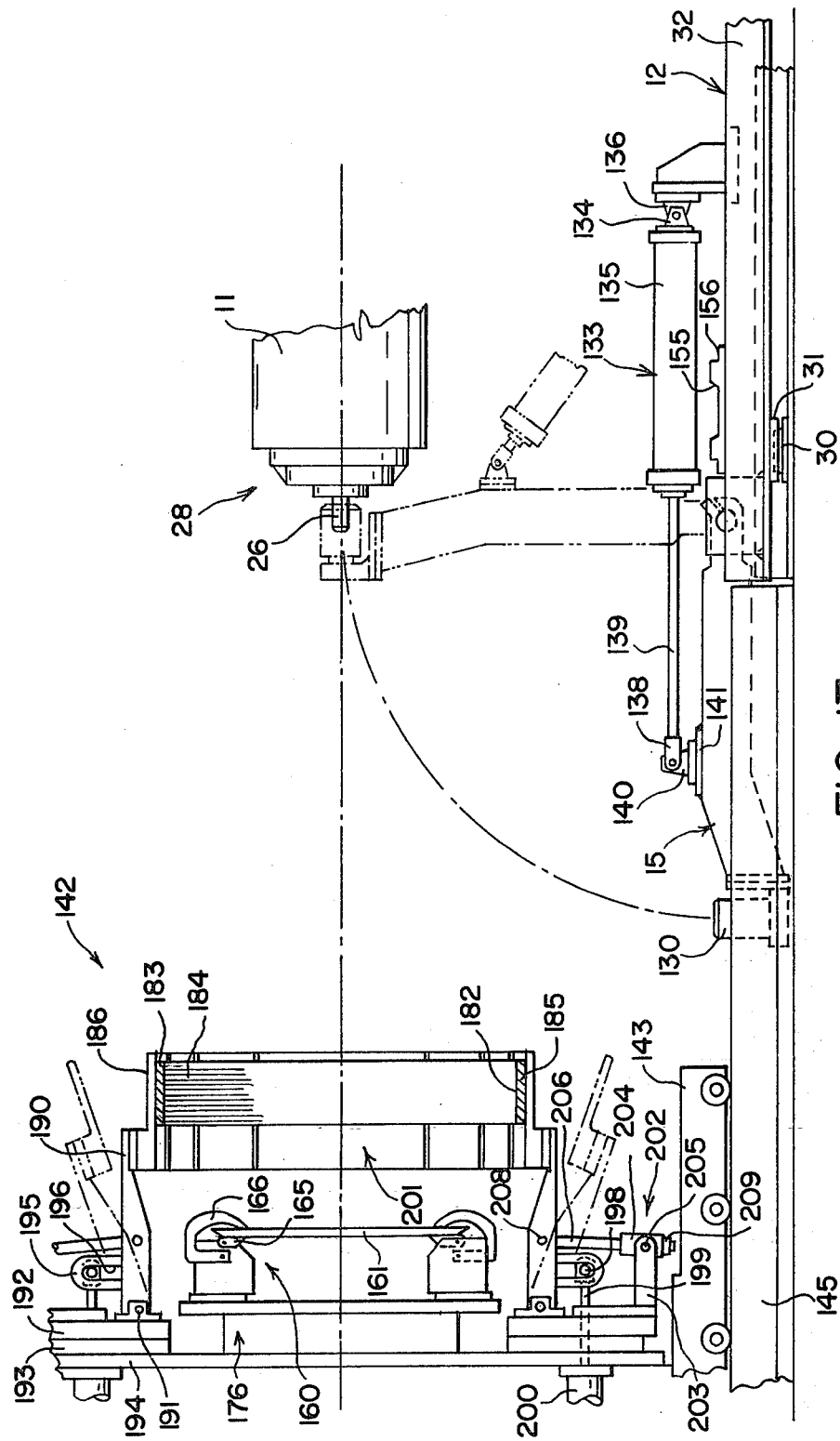
FIG. 17 is a longitudinal section, partly in side elevation, depicting movement of the drum support between its active and passive positions and movement of the tailstock toward the headstock.

Before any tire components are applied to the assembly drum 11 a bead bundle 24 is preferably placed on the bead bundle receiving arbor 25 (FIG. 10A) supported from the headstock 14. Because the bead bundle 24 is a continuous annular item it is necessary that the drum support 15 be retracted prior to placement of the bead bundle 24. FIG. 17 depicts the drum support 15 (in phantom line) engaging the outboard hub 26 of the tire assembly drum 11, at its outboard end 28. The phantom line representation of the drum support 15, then, depicts the supporting, or active, position of the drum support 15. In solid line the drum support 15 has been retracted to its passive position, and the drum 11 is supported in cantilever fashion from the headstock 14. With the support 15 thus retracted it will be apparent that a bead bundle 24 can be slipped over the drum 11 and moved axially therealong to the receiving arbor 25, at the inboard end 29 of the drum; here the bead bundle 24 will remain until it is needed, as hereinafter more fully explained.

After the bead bundle 24 is slipped over the drum 11, the drum support 15 can be returned to its active position. Thereafter the carriage 12 and platform 16 are selectively moved to successive operation stations, at each of which one of more predetermined tire components are applied to the drum 11. In the exemplary embodiment of the apparatus 10 depicted, six servers are employed at an equal number of operation stations designated consecutively as A–F.

As will be appreciated, a greater or lesser number of operation stations can be employed than the six depicted, each of which functions in conjunction with the representative embodiment of the tire building apparatus 10 by moving toward the carriage 12 and supplying a tire component to the drum 11.

Continuing with the operational overview, with the bead bundle 24 in place on the arbor 25 the operating cycle of the apparatus 10 may be actuated. Initially, the carriage 12 and platform 16 are preliminarily spotted with the drum 11 generally prepositioned at operation station A—i.e., gross alignment has been effected. Once prepositioned, the carriage 12 is lowered to effect precise positioning of the drum 11 with respect to operation station A.

Precise positioning is obtained by the use of mechanical locators on the carriage which, upon lowering of the carriage 12, interfit with a mechanical datum fixed at each operation station.

The mechanical datum (FIGS. 10A, 10B, 12 and 14 through 18) comprises a plurality, preferably at least three, of frustro-conical dogs 30 anchored in the floor. The mechanical locators comprise orienting plates 31 secured to the frame 32 of the carriage 12. Each orienting plate 31 has an aperture 33 (FIG. 16) the periphery of which is conically tapered to mate with one of the frustroconical dogs 30. With each dog 30 located within a corresponding orienting plate 31 the carriage 12, and therefore the drum 11 mounted thereon, is precisely oriented. Moreover, this arrangement permits the drum to be returned repeatedly to that precise location. The locations of the cooperating mechanical datum and the mechanical locator may, of course, be reversed.

A suitable mechanism by which the carriage can be effectively raised and lowered is best depicted in FIGS. 14–16. The wheels 19 supporting the carriage 12 are rotatably mounted on at least two axles 34. Each axle 34 is slidably received within a pair of vertically oriented stanchions 35 secured to the frame 32 of the carriage 12. Medially of the stanchions 35 each axle 34 is pivotally connected to the fulcrum end 36 of a lever arm 38. The output connection to the lever 38 comprises a laterally oriented shaft 39 that is rotatably mounted between laterally spaced, vertical posts 40 and 41, also secured to the frame 32 of the carriage.

The input force applied to the lever arm 38 is supplied by an air bladder 42. The bladder 42 operates between a base plate 43 secured to the frame 32 and a reaction plate 44 which forms the input, or force-receiving component, of the lever arm 38.

When the bladder 42 is pressurized (FIG. 16) the carriage is in the raised, or travelling position, and when the bladder is depressurized (FIGS. 14 and 15) the carriage is in its lowered, or precisely located, position.

Figure 13:
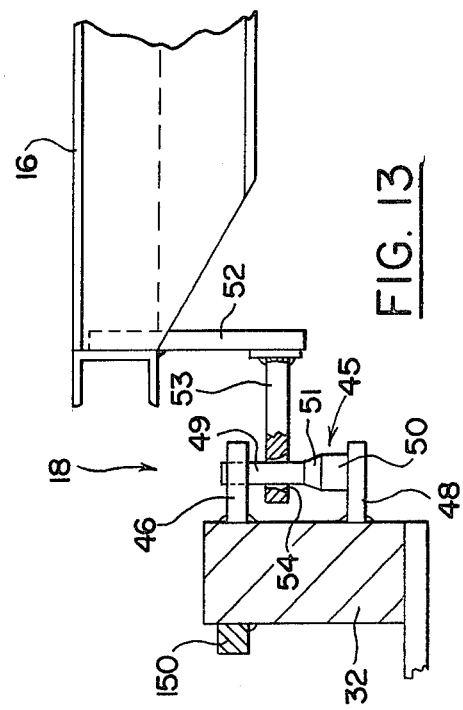
FIG. 13 is an enlarged view of a portion of FIG. 12 depicting the structure by which simultaneous movement between the platform and carriage is effected.

Movement of the carriage 12, in the travelling position of FIG. 16, is occasioned by the attachment at 18 of the carriage 12 to the operator's platform 16. The elements permitting such attachment and the operation thereof will be described with reference to FIGS. 12 and 13. Basic communication between the carriage and platform is by virtue of a pin 45 between upper and lower brackets, 46 and 48 respectively, carried by the carriage frame 32. The pin 45 comprises a long shank 49 of reduced diameter with respect to the base 50. A conical portion 51 separates the shank from the base.

A vertical arm 52 is affixed to the underside of platform 16 and carries a horizontal bracket 53. The bracket 53 is provided with a tapered bore 54 which matingly engages the conical portion 51 of pin 45. When the carriage 12 is raised vertically for movement, the conical surface 51 of pin 45 is driven into engagement with the tapered bore 54 causing positive movement of the carriage 12 along the tracks 20 as the platform 16 is driven along the floor. The platform is controlled to stop at the various operation stations throughout the complete cycle and does so with relative accuracy. When the carriage is subsequently lowered onto the dogs 30, as described hereinabove, the pin 45 is also lowered, moving the reduced diameter shank 49 into the bore 54. In this manner, the carriage 12 is permitted some movement independent of the platform 16 as it comes to rest upon the dogs 30, to insure positive alignment.

Returning now to the discussion of the operational overview, with the carriage 12, and drum 11, precisely disposed at operation station A (FIG. 1) the server 55 at that location can present the first tire components 56 individually or as a preassembly. In either event, the drum 11 is rotated through 360° by operator actuation of the appropriate foot pedal (not shown) mounted on the platform 16.

Although rotation of the drum 11 to receive the tire components may be operator actuated, the servers preferably incorporate unique electronic tracking, guidance and tensioning systems to control the components properly as they are wound onto the drum 11 and also to locate the components accurately laterally and axially with respect to the surface of the drum 11. These unique electronic systems are the subject of copending U.S.

patent application, Ser. No. 147,644, filed contemporaneously herewith and commonly owned by the Assignee of record herein.

With the first tire components placed on the drum 11, the operator continues the cycle; as the carriage 12 is raised, moved to station B (not shown) and lowered, the operator may stitch the first components by selective rotation of the drum 11 and the application of a hand held stitcher to those components.

Actuation of the cycle at each station may also include an automatic rotational indexing of the drum (by means not shown) so that as the successive components are applied their splices will occur at different preselected locations circumferentially of the drum.

At station B, second components may be applied. The carriage 12 next cycles to station C at which third components would be applied to the drum 11 from server 58.

Similarly, the operations progress through, for example, stations C, D, E and F, where additional appropriate tire components are applied. Stitching to splice the ends of each component together is preferably accomplished by a hand tool. Additionally, a mechanically operated stitcher, generally 70, is provided on carriage 12 to provide component stitching in the axial direction.

An appropriate construction for stitcher 70 is best seen in FIGS. 10B and 12. The stitcher 70 is mounted on a bed plate 71 supported on the frame 32. A pair of laterally spaced slide rods 72 and 73, respectively, are supported parallel to the axis 13 of the drum 11 as by pillow blocks 74 and 75, respectively, which are secured to, and extend upwardly of, the bed plate 71.

Left and right (as viewed from the platform 16) plinth plates 76 and 78 span between the slide rods 72 and 73 and are supported therefrom by fore and aft collars 79 and 80 dependingly secured to each plinth plate 76 and 78 and slidably engaging the rods 72 and 73.

One end of a lever 81 is pivotally mounted on each plinth plate 76 and 78, as by wrist pin 82, the other end of each lever 81 mounting rotatable stitcher wheel 83.

Individual bladders or air springs 84 are interposed between each plinth plate 76 and 78 and the medial portion of the lever 81 mounted thereon. Pressurization of a bladder 84 swings the lever 81 about the wrist pin 82 to bring the stitcher wheel 83 into contact with the material wound on the drum 11, to apply pressure (depending on the degree to which the bladder 84 is pressurized) against the components on the drum 11.

In order for the stitcher wheels 83 to traverse longitudinally along the drum 11, a screw drive 85 is provided. The left and right ends 86 and 88 of a threaded shaft 89 are rotatably journalled in bearings 90 and 91, respectively. One half of the shaft 89 is provided with right hand threads, as at 92, and the other half of the shaft 89 is provided with left hand threads, as at 93. Right hand threads 92 operatively engage a threaded follower 94 secured to plinth plate 76, and the left hand threads 93 operatively engage a threaded follower 95 secured to plinth plate 78. Drive means 96, connected to the shaft 89 as by the chain 98 and sprocket 99 arrangement depicted, selectively rotates the shaft 89 to move the stitcher wheels 83 in the desired direction along the drum 11.

The aforesaid stitcher 70 can be automatically operated as the carriage moves, for example, from station C to station D so that when the drum 11 is positioned at station D the previously deposited component will have been stitched to the underlying components applied at stations A and B.

The stitcher is elevated to its operating position, as depicted in FIGS. 10B and 12, by virtue of a double-acting pneumatic cylinder 100 having an extensible piston rod 101 pivotally connected to the underside of bed plate 71 at 102. In the operating position the bed plate 71 and, in turn, stitcher 70, rests upon a pair of horizontally disposed frame members 103 and 104 which are vertically supported by frame members 105 and 106, respectively, and cross-braced by members 108. When the stitcher is in its rest position (not shown) the piston rod 101 is retracted pulling with it the bed plate 71. Frame members 103, 105 and 104, 106 are pivotally mounted to the bed plate 71 as at 109 and to the frame 32 as at 110 and rotate through an arc of about 90° to the rest position wherein members 105 and 106 are horizontally disposed within the frame 32 and members 103 and 104 are now vertically disposed, supporting the bed plate 71. Pivotal mounting of the opposite end (not shown) of cylinder 100 allows the cylinder to repose within the frame 32 underneath the stitcher 70.

Figure 3:
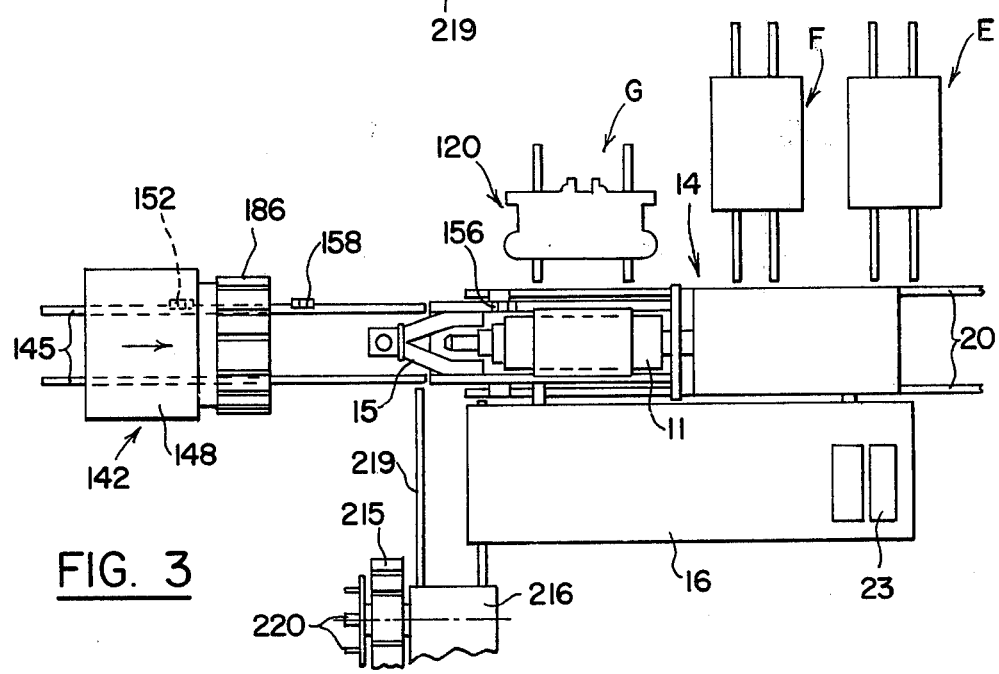
FIG. 3 is a schematic partial plan similar to FIG. 2 depicting the tire assembly drum at station G but with the drum support in its passive position.

Thereafter, the carriage 12 is moved to operation station G (FIG. 3). Station G is not an application station, but rather the final assembly and finishing station at which the drum 11 is aligned with a conventional stitcher, generally 120, employed to stitch the green tire after it has been shaped to its toroidal configuration.

Once the carriage 12 is positioned at station G the drum support 15 is retracted (the solid line representation depicted in FIG. 17). The support 15 comprises an A-frame pedestal 125 (FIGS. 10B, 12 and 17), the base of which is carried by a shaft 126, extending transversely with respect to the carriage 12, and journalled in spaced bearing blocks 128 and 129. A rotating bearing assembly 130 is mounted on a ridge plate 131 secured to the peak 132 of pedestal 125 and adapted rotatably to receive the outboard hub 26 of the drum 11.

A double acting piston assembly 133 swings the support 15 between its supporting position (phantom line, FIG. 17) and its passive, or retracted, position (solid line, FIG. 17).

A clevis 134 on the inboard end of the cylinder 135 is pivotally secured to an anchor eye 136 mounted on the frame 32 of the carriage 12. A clevis 138 on the outboard end of the piston rod 139 is pivotally attached to an eye 140 rigidly secured to a horizontal brace 141 in the pedestal 125.

By attaching the rod 139 to a double acting piston (not shown) operating within the cylinder 135, the drum support 15 may be positively driven from supporting to retracted position.

Figure 4:
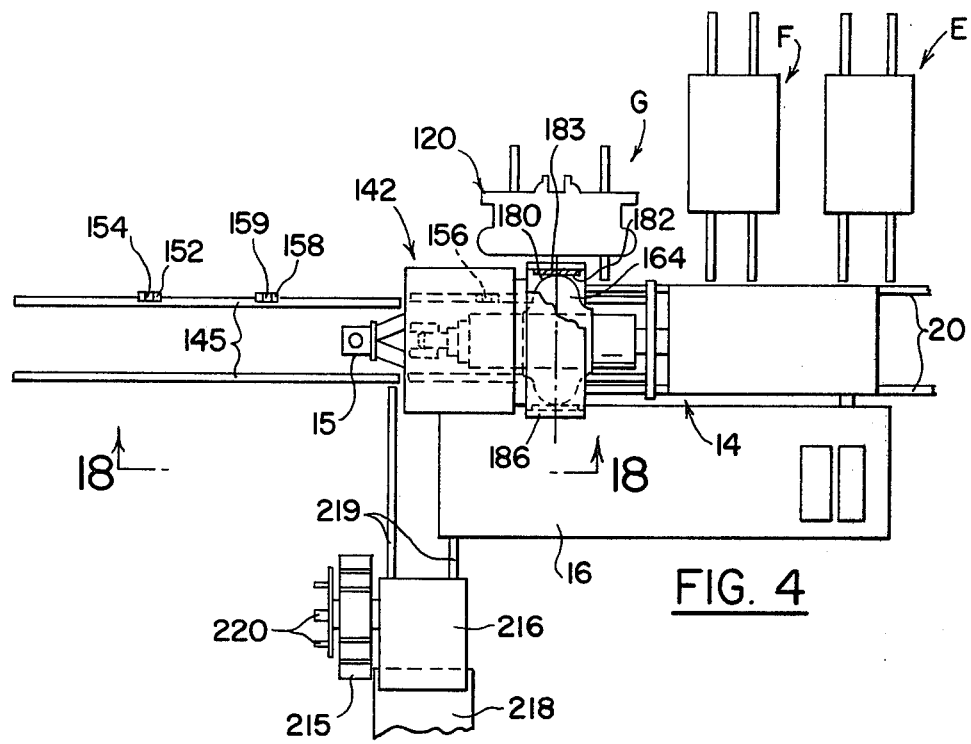
FIG. 4 is a schematic partial plan view similar to FIGS. 2 and 3 but with the tailstock in its active position.
Figure 18:
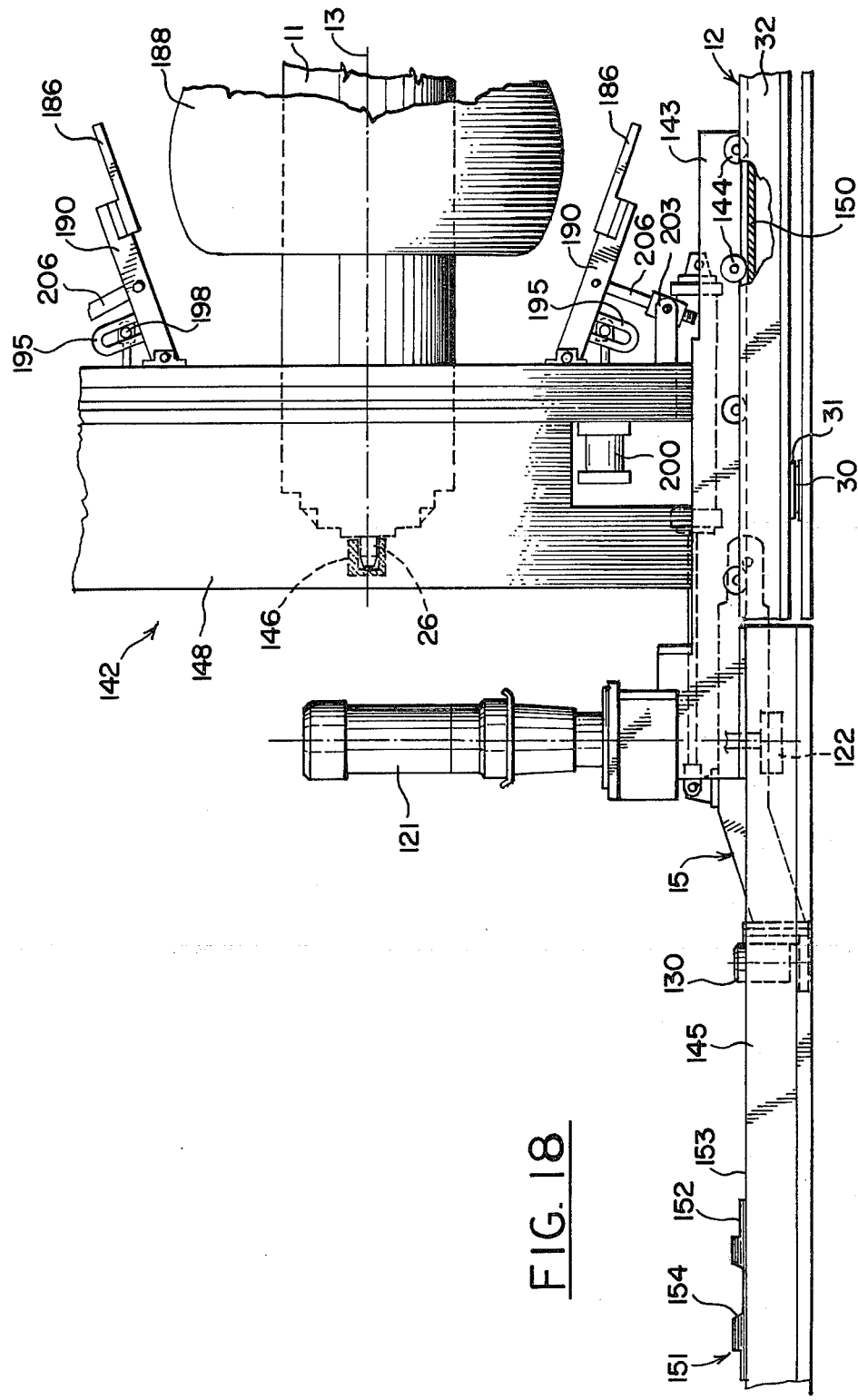
FIG. 18 is an enlarged side elevation taken substantially along line 18—18 of FIG. 4 depicting the tailstock on the carriage, in its active position.

With the drum support 15 retracted, the tailstock 142, on supporting dolly 143, is moved from its passive, or home, position (FIGS. 2 and 17) to its active position (FIGS. 4 and 18). As represented in FIG. 18, a motor 121 secured to the rear base of the dolly 143 may selectively drive a wheel 122 which engages the inner sidewall of one of the rails 145 that serve as the guideway for the tailstock 142.

The tailstock 142 is supported on a dolly 143 having wheels 144 which travel on elevated rails 145. Aligned rail extensions 149, 150 (FIG. 14) presented from the opposed surfaces of the side frame members 32, receive the wheels 144 when the tailstock 142 is in its active position, depicted in FIG. 4. When the tailstock 142 is in its active position, the dolly 143 must necessarily clear the drum support 15 in its passive position, as best seen in FIG. 18. As the dolly 143 moves into its active position, the hub 26 of the drum 11 rotatably engages a bearing assembly 146 supported by the frame 148 of the tailstock 142. By thus supporting the hub 26, any deflection thereof resulting from stresses imparted by its cantilevered support from the headstock 14 is removed, thereby assuring that the components yet to be applied will be precisely deposited with respect to the axis 13.

Figure 2:
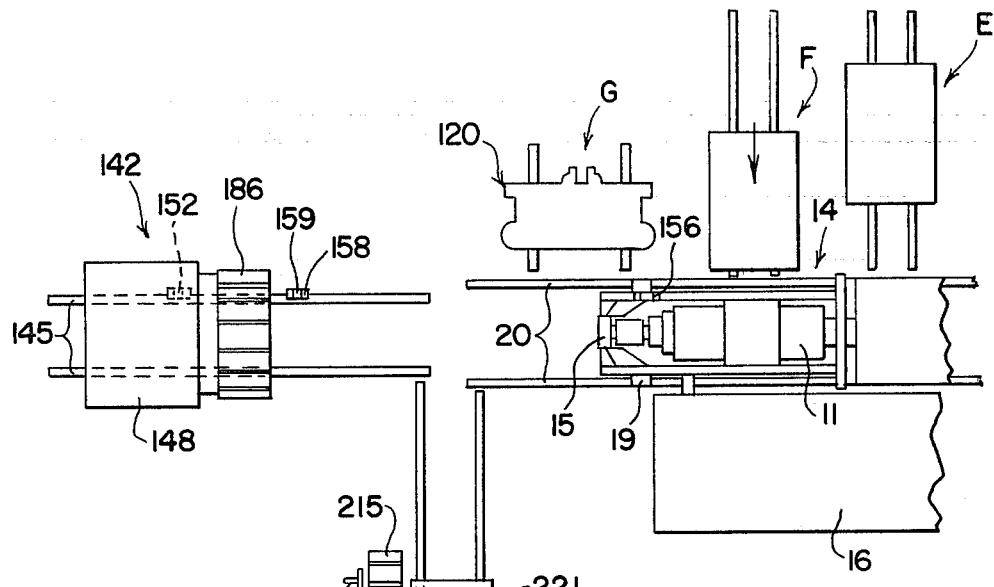
FIG. 2 is a schematic partial plan view similar to a portion of FIG. 1 and depicting the tire assembly drum located at operation station F.

An interlocking mechanism 151 is operated between the dolly 143 and the elevated rails 145 to hold the tailstock 142 in the passive position depicted in FIGS. 2 and 17. With reference to FIG. 18, the interlocking mechanism includes a locating plate 152 firmly affixed to the upper surface 153 of the rail 145. Plate 152 is on the far rail 145, as depicted in FIG. 1, but does not span the entire width of rail surface 153, in order to allow for movement of the wheels thereover. The plate 152 is provided with a tapered recess 154 which receives a mating plunger connected to a piston extension from a conventional double-acting pneumatic cylinder, which is in turn mounted on the lower sidewall of frame 148. The plunger, piston extension and cylinder are not shown inasmuch as they are carried on the far side of the tailstock frame 148, not visible in the drawings.

When the tailstock 142 is in its passive position, the plunger is received in the recess 154 of plate 152 depicted in FIG. 18. In its active position, when tailstock 142 is on board the frame 32 of carriage 12 and supporting the outboard hub 26 of drum 11, the plunger is driven into the recess 155 of a plate 156 (FIG. 17). One other plate 158 is provided to position the tailstock 142 for receipt of the belt and tread preassembly as will be described hereinbelow. That plate 158 is carried on the far elevated rail 145 (FIG. 1) and has a recess 159 which receives the plunger as hereinbefore described, thereby establishing a transfer position.

The interlocking mechanism 151 joins the dolly 143 to the carriage 12 and effects an accurate longitudinal positioning of the tailstock 142 with respect to the drum 11 so that the belt and tread and belt preassembly carried by the tailstock 142 is accurately positioned with respect to the components previously assembled on the drum 11. The interlocking mechanism 151 also assures that the novel bead gripping mechanisms 160 carried on the tailstock 142 and on the headstock 14 will locate the opposing bead bundles 24 and 161 precisely with respect to each other and with respect to the components previously deposited on the drum 11.

The bead bundle 161 as represented in FIG. 17 is accurately positioned circumjacent an outboard bead set location. At the bead set location, previously applied components are disposed between the bead bundle 161 and the drum 11. Bead bundle 24 is similarly disposed at the inboard, headstock end with respect to those same components.

The bead gripping mechanisms 160 maintain the position and orientation of the outboard and inboard bead bundles 161 and 24, respectively, as the drum 11 effects its initial radial expansion. The initial expansion of the drum 11 drives the tire components at the bead set location into locking engagement with the radially inner surface 163 of each bead bundle 24 and 161, thereby securing the relative position of the bead bundles with respect to the components previously applied to the drum 11.

Figure 5:
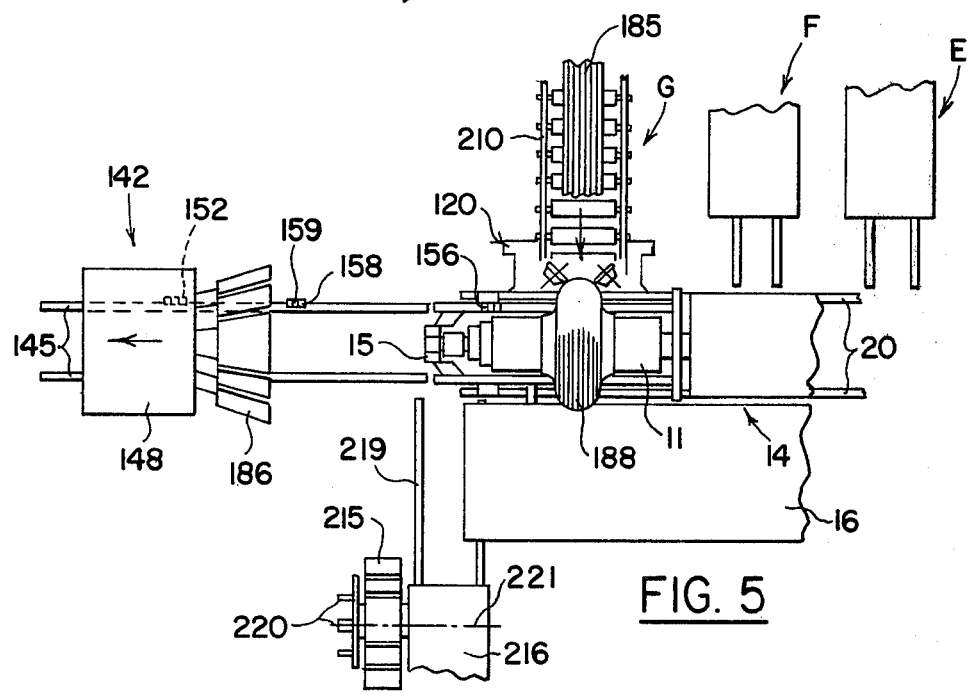
FIG. 5 is a schematic partial plan view similar to FIGS. 2 through 4 but depicting the tailstock retracted to its passive position, the drum support in active position, and with the stitcher at operation station G finalizing the green tire on the tire assembly drum.

Once the bead bundles 24 and 161 are thus secured to the underlying components on the drum 11, the bead gripping mechanisms 160 can be released and retracted from their operative position in order to permit continued shaping of the components on the drum into the toroidal casing 164 depicted in FIGS. 4 and 5.

The unique construction and operation of bead gripping mechanisms 160 are the subject of copending U.S. patent application, Ser. No. 147,669, filed contemporaneously herewith and commonly owned by the Assignee of record herein. Should a detailed disclosure of the unique gripping mechanisms 160 be desired, one should refer to the aforesaid, copending application. However, the following brief explanation of the gripping mechanisms 160 is deemed sufficient to facilitate the disclosure of the subject invention to one skilled in the art. Inasmuch as the bead gripping mechanisms for bundles 161 and 24 are structurally similar, a brief description of only one, on the headstock 14, shall be set forth.

With reference to FIG. 10A, the gripping mechanism 160 comprises inner and outer clamping elements 165 and 166 presented from a platen assembly 168. The platen assembly 168 may be reciprocated longitudinally with respect to axis 13 of the drum 11. The platen assembly 168 incorporates a pair of rails 169 that ride on a plurality of rollers 170 rotatably mounted on plates 171 secured to the frame members 172 of the headstock 14. The platen assembly 168 has a cylindrical body portion 173 secured to the rails 169 by a pair of mounting flanges 174 that extend diametrically outwardly from the body portion 173; a vertical mounting plate 175 is secured to the body portion 173. A plurality of gripping mechanisms 160 are spaced circumferentially of the mounting plate 175—and thus also circumferentially of the drum 11.

The gripping mechanisms 160 presented by the tailstock 142 include a plurality of inner and outer clamping elements 165 and 166, mounted on a platen assembly 176 that is axially movable with the tailstock 142.

Release of the bead bundles 24 and 161 occurs by rotation of the outer clamping elements 166 following which the drum may continue to expand in well known fashion to shape the components deposited thereon into the familiar toroidal casing 164. The shaping operation per se is well known to the art and is not deemed to be a feature of the subject invention. Hence, no detailed explanation of that step need be provided.

As the tire casing 164 is formed, the radially outer periphery 180 thereof expands within and against the radially inner surface 182 of the tread and belt preassembly 183, the tread and belt preassembly 183 comprising the radially inner circumferentially inextensible belts 184 (FIG. 17) and the radially outer treadstock 185. The tread and belt preassembly 183 is supported by an assembly of grab segments 186 carried on the tailstock 142, and the tread and belt preassembly 183 is accurately positioned with respect to the expanding drum 11 by virtue of the precision with which the interlocking mechanism 151 locates the tailstock 142 with respect to the drum 11.

Inasmuch as the belts 184 are circumferentially inextensible, when the casing 164 expands against the tread and belt preassembly 183, the tread and belt preassembly is thereby partially joined to the casing so that when the casing 164 has assumed its toroidal configuration the segments 186 may release the tread and belt preassembly 183 without deleteriously affecting the casing, or the tread and belt preassembly positioned thereon.

Figure 6:
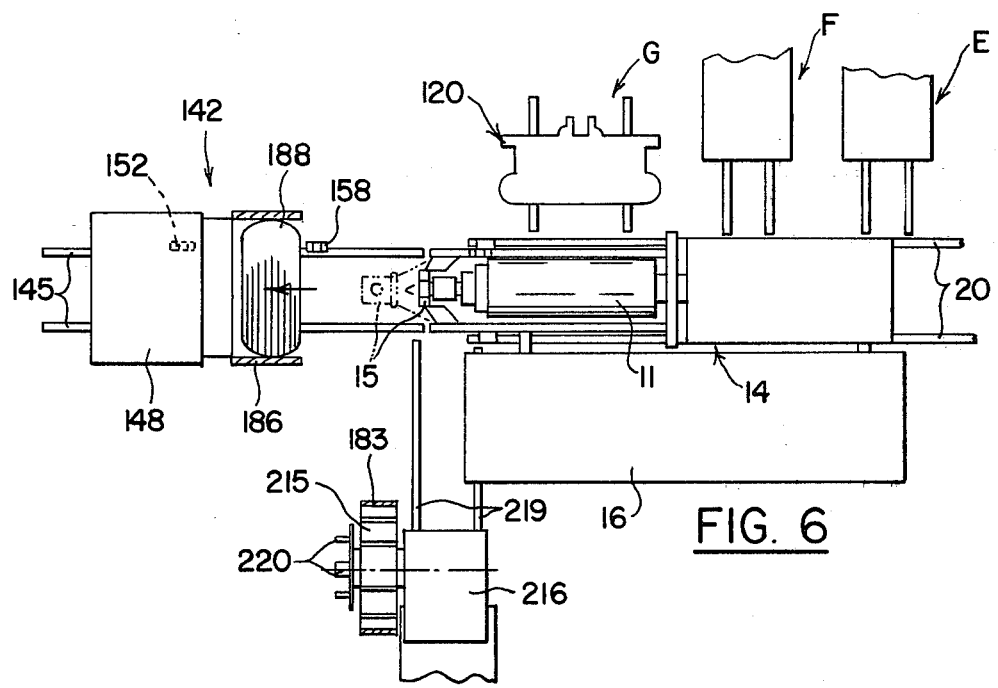
FIG. 6 is another schematic partial plan view similar to FIGS. 2 through 5 but depicting the green tire having been removed by the tailstock.

As soon as the segments 186 release the tread and belt preassembly 183 the tailstock 142 withdraws along elevated rails 145 to its passive position (FIG. 2), and the drum support 15 will be swung to its active position (FIG. 5) in support of the outboard hub 26 of the drum 11; the drum 11 will rotate the complete green tire 188 now formed thereon against the conventional stitcher 122 presented from station G, to secure the multiple components of the green tire 188; thereafter the green tire may be removed, as in FIG. 6.

With respect to the grab segments 186, each is, as best seen in FIG. 17, connected to an arm 190 pivotally mounted as at 191 to a slide bed 192 which is, in turn, adjustably mounted on a radial V-guide plate 193 fixedly secured to the flange 194 defining the forward periphery for the frame 148 of the tailstock 142.

A cam lever 195 is rigidly secured to the arm 190 and is provided with an elongated slot 196 within which travels a crosshead 198 itself attached to the outboard end of a piston rod 199 that is selectively reciprocated by a double-acting cylinder 200, suitably mounted to the frame 148. As depicted in FIG. 17 extension of the piston rod 199 urges the arm 190 and segment 186 radially inwardly to gripping position. To move the segment 186 radially outwardly, or open, depicted in phantom, the piston rod retracts bringing the crosshead 198 to the bottom of the slot 196 and rotating the arm 190 about the pivot 191.

In order for the segments 186 to grip a belt and tread preassembly 183 or a green tire 188, their radially inward movement must be fixed to define an annular hoop, depicted generally by the numeral 201. To this end, a stop mechanism 202 is provided, which comprises a yoke 203 rigidly secured to the slide bed 192 and a rocker block 204 is mounted at 205 between the tynes forming the yoke 203 for limited rotation. A threaded stop rod 206 is pivotally mounted, as at 208, to the arm 190 and extends through the rocker block 204. An adjustment nut 209 thereon permits regulation of the final disposition of the segment 186 in its gripping position.

Further adjustment is facilitated by movement of the slide bed 192 on the guide plate 193 to the proper position, given the diameter of the hoop 201 that is desired. When the proper position has been located, the plates may be fixed by tightening set screws (not shown). Different diameters are also accommodated by substituting segments 186 of other dimensions.

In some tire constructions, it may be desirable to apply only the belt preassembly 184 from the tailstock 142 to the expanded casing 164, following which the treadstock 185 can be separately added. The treadstock 185 could be applied in such an instance at operation station G by feeding the treadstock 185 from a suitable conveyor 210 or other feeding means, as schematically depicted in FIG. 5. Expansion of the drum 11, and casing 164, followed by the application of either the belt and tread preassembly 183 or the separate application of a belt preassembly 184 and treadstock 185 will include the necessary stitching from stitcher 122, as will be understood by those skilled in the art, prior to removal of the green tire 188 from the drum 11.

Returning now to the operational overview, after the green tire 188 has been subjected to its final stitching at operation station G and the stitcher 122 has been withdrawn, the drum support 15 may once again be retracted to permit the tailstock 142 to be moved along the elevated rails 145 and into its active position on the rail extensions 149, 150. So positioned, the segments 186 grasp the green tire 188 so that withdrawal of the tailstock 142 removes the green tire from the drum 11 (FIG. 6), whereupon it may be removed from the tailstock 142 by means not shown.

After the green tire 188 has been removed from the tailstock 142 the operator places another bead bundle 24 over the drum 11 and positions it on the receiving arbor 25 supported from the platen 175 on headstock 14. The drum support 15 can once again be swung to its active position and the carriage 12 returned to operation station A. During the operations at station G, the operator may conveniently prepare a new belt and tread preassembly 183, for loading onto the tailstock 142, preparatory to making another tire. Specifically, an assembly head 215 is rotatably supported from the frame 216 of a carriage 218 movable along a pair of rails 219 secured to the floor at right angles to the elevated rails 145 along which the carriage 12 and tailstock 142 reciprocate.

One or more inextensible belts 184 are applied circumferentially of the assembly head 215 and a suitable tread stock material 185 is positioned circumjacent thereto. In addition, a bead bundle 161 is hung on preppositioning fingers 220 which are spaced circumferentially and concentrically inwardly with respect to the assembly head 215 and which are oriented parallel to the longitudinal axis 221 of the assembly head 215.

Figure 7:
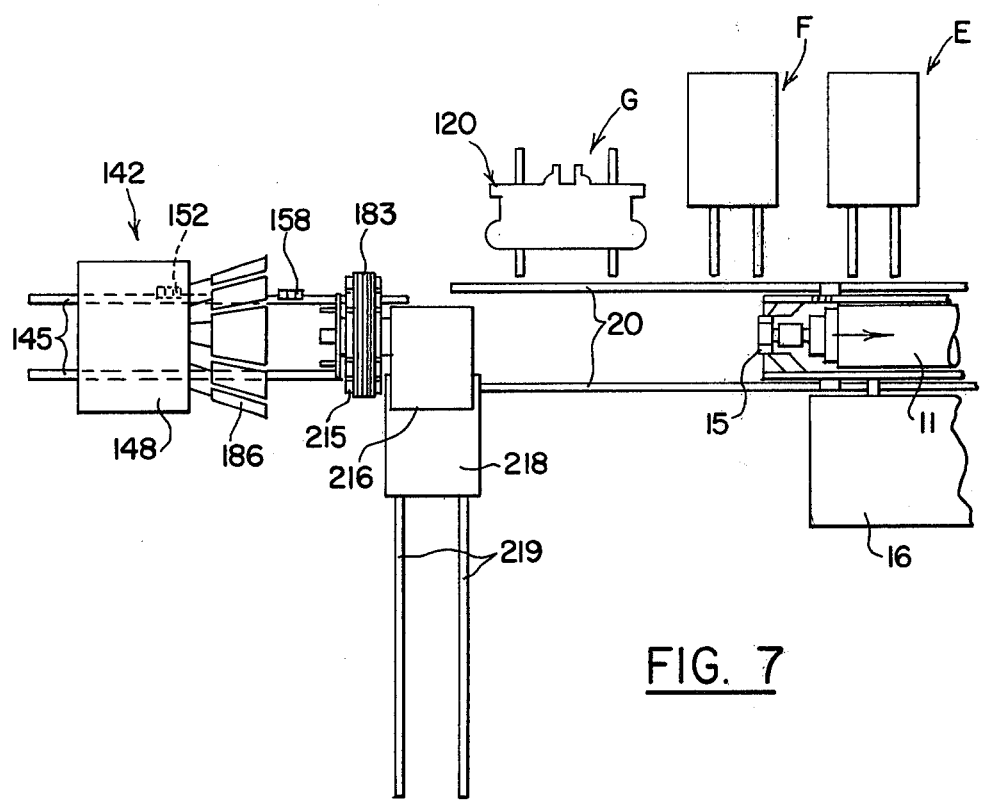
FIG. 7 is yet another schematic partial plan view similar to FIGS. 2 through 6 but depicting the tire assembly drum moving toward station A for recycling, and further depicting the assembly head on which the tread and belt preassembly have been fabricated moved into position for transfer of that preassembly to the tailstock.
Figure 8:
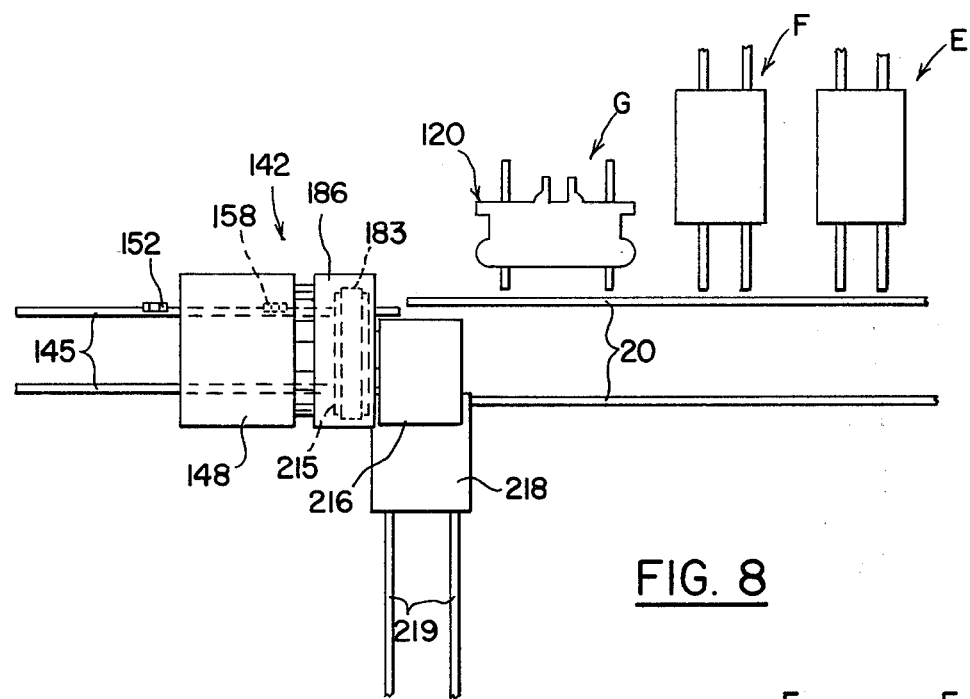
FIG. 8 is yet another schematic partial plan view similar to FIGS. 2 through 7 depicting the tailstock in an intermediate position for transfer of the tread and belt preassembly from the assembly head to the grabs.
Figure 9:
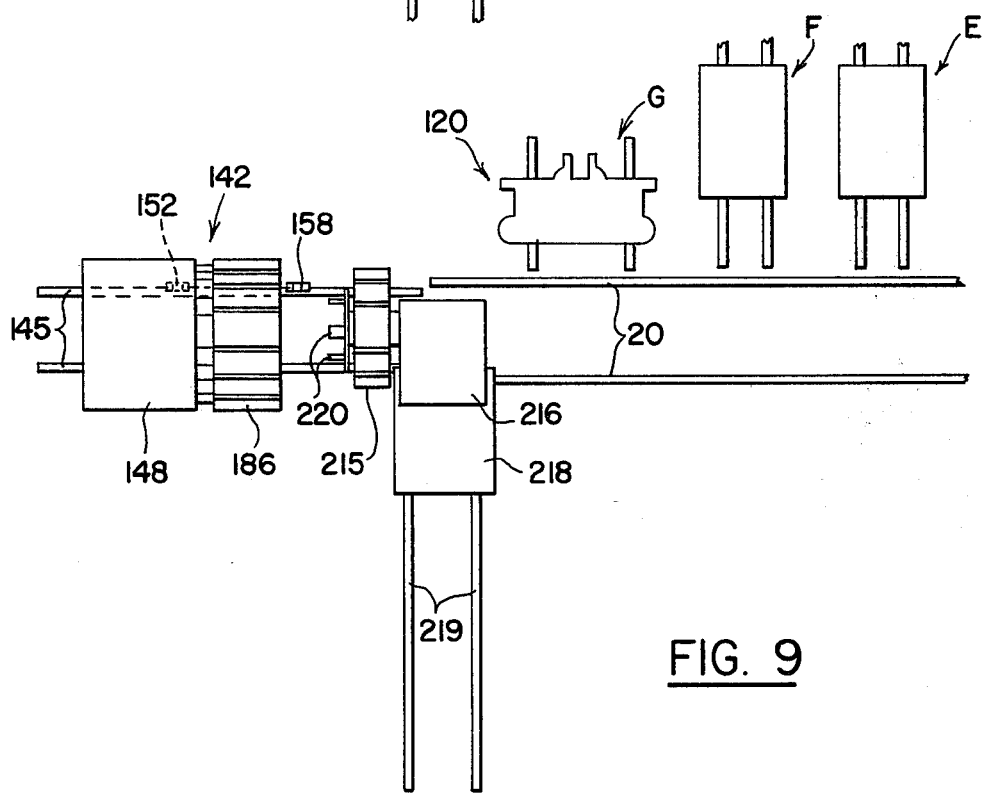
FIG. 9 is yet another schematic partial plan view similar to FIGS. 2 through 8 depicting the tailstock in its home position, carrying a tread and belt preassembly for manufacture of the next tire, and the assembly head preparatory to moving back to its home position.

After the belt and tread preassembly 183 is completed and with the bead bundle 161 positioned on the fingers 220 the carriage 218 is moved along rails 219 and stopped with the assembly head 215 aligned with respect to the tailstock 142 as depicted in FIG. 7. The carriage 218 can be provided with a separate drive means (not shown) and a mechanism for raising and lowering similar to the one described hereinabove in conjunction with the carriage 12. Accurate positioning can also be facilitated by lowering the carriage 218 onto a set of frustro-conical dogs (not shown) as are also used to locate the carriage 12. With the carriage 218 in position (FIG. 7), the tailstock 142 is moved to the transfer position as depicted in FIG. 8 with grab segments 186 in the open position. To fix this position, the plunger of the interlocking mechanism is driven into the recess 159 of plate 158 on rail 145. With the tailstock 142 in precise disposition, both laterally and longitudinally, with respect to the assembly head 215, the preassembly 183 is engaged by the grab segments 186 and the bead bundle 161 grasped by the gripping mechanisms 160 on the tailstock 142.

The tailstock 142 is thereafter withdrawn to its passive position to wait until the components carried thereon are required for completing the next tire and the carriage 218 with the assembly head 215 is returned to its passive position.

Gross alignment of the tire assembly drum with the server at each station may be effected by virtue of an electrical alignment assembly indicated by the numeral 230 (FIG. 11). Electrical alignment assembly 230 includes an encoder generator 231 mounted on a bracket 232 pivotally attached to the carriage 12. Encoder generator 231 may be any conventional rotary pulse generator providing two electrical pulse train output signals the number of pulses in which is proportional to the incremental rotation of the rotary pulse generator shaft, and the phase relationship between which is indicative of the direction of rotation of the shaft. Toothed sprocket 233 is mounted on the output shaft of encoder generator 231 and engages a notched rack 234 fixed to the floor such that as carriage 12 moves in either direction a signal indicative of its instantaneous position and relative direction of motion is generated by encoder generator 231.

The signals from encoder generator 231 may be received and processed for suitable control of drive motor 225 in a manner similar to that shown in copending patent application Ser. No. 147,644 filed contemporaneously herewith and commonly assigned to the owner of record, or in any other manner as would occur to the skilled artisan, thus permitting relatively accurate gross alignment—i.e., within the tolerance available when a particular tooth on sprocket 233 meshes with a particular set of teeth on the rack 234. The gross alignment may therefore be achieved within approximately 31.75 millimeters (0.125 inches). Fine alignment is achieved by use of interengaging dogs 30 and orienting plates 31, as set forth hereinabove, to a positioning accuracy of within approximately 0.508 millimeters (0.0020 inch).

From the foregoing description it should be apparent that the subject tire building apparatus achieves the desired precise alignment of a tire assembly drum with a plurality of servers at a successive series of operation stations to accomplish accurate placement of the tire components on the drum and otherwise also accomplish the objects of the invention.

We claim:

1. A tire building apparatus comprising:
   a longitudinally movable carriage;
   means for guiding the longitudinal movement of said carriage;
   a headstock mounted on said carriage;
   a tire assembly drum having an inboard and outboard end;
   the inboard end of said tire assembly drum operatively connected to said headstock;
   a drum support mounted on said carriage;
   the outboard end of said tire assembly drum operatively connected to said drum support;
   a plurality of operation stations spaced longitudinally along the means for guiding the longitudinal movement of said carriage;
   a mechanical datum fixedly located at each operation station;
   mechanical locators secured to said carriage; and,
   means selectively to engage said locators with the mechanical datum at each successive station precisely to locate said tire assembly drum with respect to said operation station.

2. A tire building apparatus, as set forth in claim 1, wherein means are provided to effect a gross alignment of the mechanical locators with respect to said mechanical datum at each operation station;
   said mechanical locators being oriented in substantially vertical alignment with said mechanical datum when said carriage is grossly oriented at each said operation station; and,
   means to lower and raise said carriage selectively to engage and disengage said locators and said mechanical datum to effect the precise orientation of said tire assembly drum with respect to the desired operation station.

3. A tire building apparatus, as set forth in claim 2, further comprising:
   a frame supporting said carriage;
   axle members supporting said frame;
   wheels rotatably mounted on said axle members to permit the longitudinal movement of said carriage;
   at least one fluid bladder operatively interposed between said carriage frame and said axle members to lower and raise said carriage with respect to said axle members whereby to engage and disengage said locators and said mechanical datum.

4. A tire building apparatus, as set forth in claim 3, wherein said mechanical locators comprise orienting plates secured to said carriage frame, each said orienting plate having an aperture the periphery of which is preferably tapered; and wherein said mechanical datum comprises dogs adapted matingly to engage said apertures.

5. A tire building apparatus comprising:
   a longitudinally movable carriage;
   means for guiding the longitudinal movement of said carriage;
   a headstock mounted on said carriage;
   a tire assembly drum having an inboard and outboard end;
   the inboard end of said tire assembly drum operatively connected to said headstock;
   a drum support pivotally mounted on said carriage;
   the outboard end of said tire assembly drum presenting a hub;
   a bearing assembly carried on said drum support;
   said bearing assembly adapted rotatably to engage and disengage from said hub; and
   means to swing said drum support pivotally between an active and passive position, respectively, to engage and disengage said bearing assembly and said hub.

6. A tire building apparatus, as set forth in claim 5, further comprising:
   a tailstock;
   means to move said tailstock longitudinally;
   means to guide the longitudinal movement of said tailstock onto said longitudinally movable carriage; and
   means to support said tailstock on said longitudinally movable carriage;
   said tailstock adapted rotatably to engage the hub on said tire assembly drum when said drum support is in its passive position.

7. A tire building apparatus, as set forth in claim 6, further comprising:
   grab segments operatively mounted on said tailstock; and
   means to activate said segments selectively to deposit annular assemblies on said tire drum and to remove annular assemblies from said drum.

8. A tire building apparatus, as set forth in claim 7, wherein the means to activate each said segment comprises:
   a guide plate secured to said tailstock and oriented radially with respect to the longitudinal axis of said tailstock;
   a slide bed movably mounted on said guide plate to reciprocate radially with respect thereto;
   an arm having opposite ends;
   one end of said arm pivotally attached to said slide bed;
   the other end of said arm affixed to a segment;
   a cam lever fixedly secured to said arm and having an elongated slot therein;
   a crosshead movable within said slot; and
   a double acting cylinder having an extensible piston rod, the end of which is connected to said crosshead, whereby extension of said piston rod moves said arm and segment radially inwardly.

9. A tire building apparatus, as set forth in claim 8, further comprising:
a yoke fixedly secured to said slide bed;
a rocker block mounted to said yoke;
a link having opposed end portions;
one end portion of said link being pivotally mounted on said arm;
the opposite end portion of said link extending through said rocker block; and
means selectively engaging said opposite end portion of said link and engageable with said rocker block to control radially inwardly directed movement of said arm and said segment.

10. A tire building apparatus, as set forth in claims 1 or 5, further comprising:
a stitcher mounted on said carriage.

11. A tire building apparatus, as set forth in claim 10, wherein said stitcher further comprises:
a pair of plinth plates mounted on said carriage and slidable substantially parallel to the longitudinal axis of the tire assembly drum carried on said headstock;
an arm having opposed ends, one end pivotally mounted on each said plinth plate;
a stitching wheel rotatably mounted on the opposite end of each said arm; and
means selectively to pivot said arm and bring said stitcher wheel into contact with said drum.

12. A tire building apparatus, as set forth in claim 11, wherein means are provided selectively to move said plinth plates toward and away from each other.

13. A tire building apparatus, as set forth in claim 11, wherein the means selectively to pivot said arm comprises an inflatable bladder interposed between said arm and the plinth plate upon which said arm is pivotally mounted.

14. A method for building a vehicular tire on a tire assembly drum which is rotatably supported by a headstock comprising the steps of:
providing a first movable carriage carrying a tire assembly drum;
supporting the outboard end of the rotatable tire assembly drum by a drum support;
providing a tailstock on a second movable carriage;
grossly moving said first carriage to a successive plurality of operation stations;
precisely orienting said first carriage at each successive operation station;
sequentially applying tire components to the tire assembly drum at successive operation stations;
moving said drum support to a passive position;
moving said second carriage and tailstock onto said first carriage to engage the outboard end of said tire assembly drum rotatably with the tailstock;
toroidally shaping the components on said tire assembly drum against a tread assembly held by said tailstock.

15. A method, as set forth in claim 14, comprising the further steps of:
accurately locating bead bundles with respect to said tire assembly drum prior to toroidally shaping the components previously applied to said drum.

16. A method, as set forth in claim 15, comprising the further steps of:
providing bead bundle prepositioning arbors on said headstock and said tailstock; and
preliminarily locating one bead bundle on each prepositioning arbor prior to moving the tailstock onto said first carriage.

17. A method, as set forth in claim 14, comprising the further steps of:
moving said tailstock to a passive position;
moving said drum support to its active position;
stitching the tire on said tire assembly drum; and
removing the green tire from the tire assembly drum.

* * * * *